(12) United States Patent
Munshi et al.

(10) Patent No.: US 11,705,719 B1
(45) Date of Patent: Jul. 18, 2023

(54) FAST DISCONNECTS FOR GENERATOR SYSTEMS

(71) Applicant: Hamilton Sundstrand Corporation, Charlotte, NC (US)

(72) Inventors: Abhay V. Munshi, Lake in the Hills, IL (US); Mark J. Nauman, Winnebago, IL (US); Paul J. Peterson, Rockford, IL (US); Kamaraj Thangavelu, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/741,397

(22) Filed: May 10, 2022

(51) Int. Cl.
*H02H 7/06* (2006.01)
*H02P 9/10* (2006.01)

(52) U.S. Cl.
CPC ............ *H02H 7/065* (2013.01); *H02P 9/107* (2013.01)

(58) Field of Classification Search
CPC ............................... H02H 7/065; H02P 9/107
See application file for complete search history.

(56) References Cited

U.S. PATENT DOCUMENTS

| | | | |
|---|---|---|---|
| 4,477,765 A | 10/1984 | Glennon et al. | |
| 6,850,043 B1 | 2/2005 | Maddali | |
| 8,576,522 B2 | 11/2013 | Beneditz et al. | |
| 8,861,147 B2 | 10/2014 | White et al. | |
| 9,018,889 B2 | 4/2015 | Patel | |
| 9,059,584 B2 | 6/2015 | Spannhake et al. | |
| 10,000,296 B2 | 6/2018 | Seher et al. | |
| 2012/0182648 A1* | 7/2012 | Maddali | H02M 5/293 361/21 |
| 2014/0307490 A1* | 10/2014 | Sagona | H02H 7/1252 363/52 |

* cited by examiner

*Primary Examiner* — Zoheb S Imtiaz
(74) *Attorney, Agent, or Firm* — Locke Lord LLP; Scott D. Wofsy; Gabrielle L. Gelozin

(57) ABSTRACT

In accordance with at least one aspect of this disclosure, a system includes a generator control relay configured to electrically connect a generator and an exciter switch drive to drive an exciter switch. A first processor is operatively connected to control a state of the generator control relay to control the electrical connection between a generator and the exciter switch drive. The system includes an exciter drive configured to generate excitation current for field windings of a generator system based on a state of the exciter switch. A second processor is operatively connected to control the exciter drive and to communicate with the first processor during a fault event to place the generator control relay in an open state, disconnecting the generator from the exciter switch drive to prevent generation of excitation current. In certain embodiments, the first processor can include a microcontroller and the second processor can include a voltage regulation processor.

12 Claims, 1 Drawing Sheet

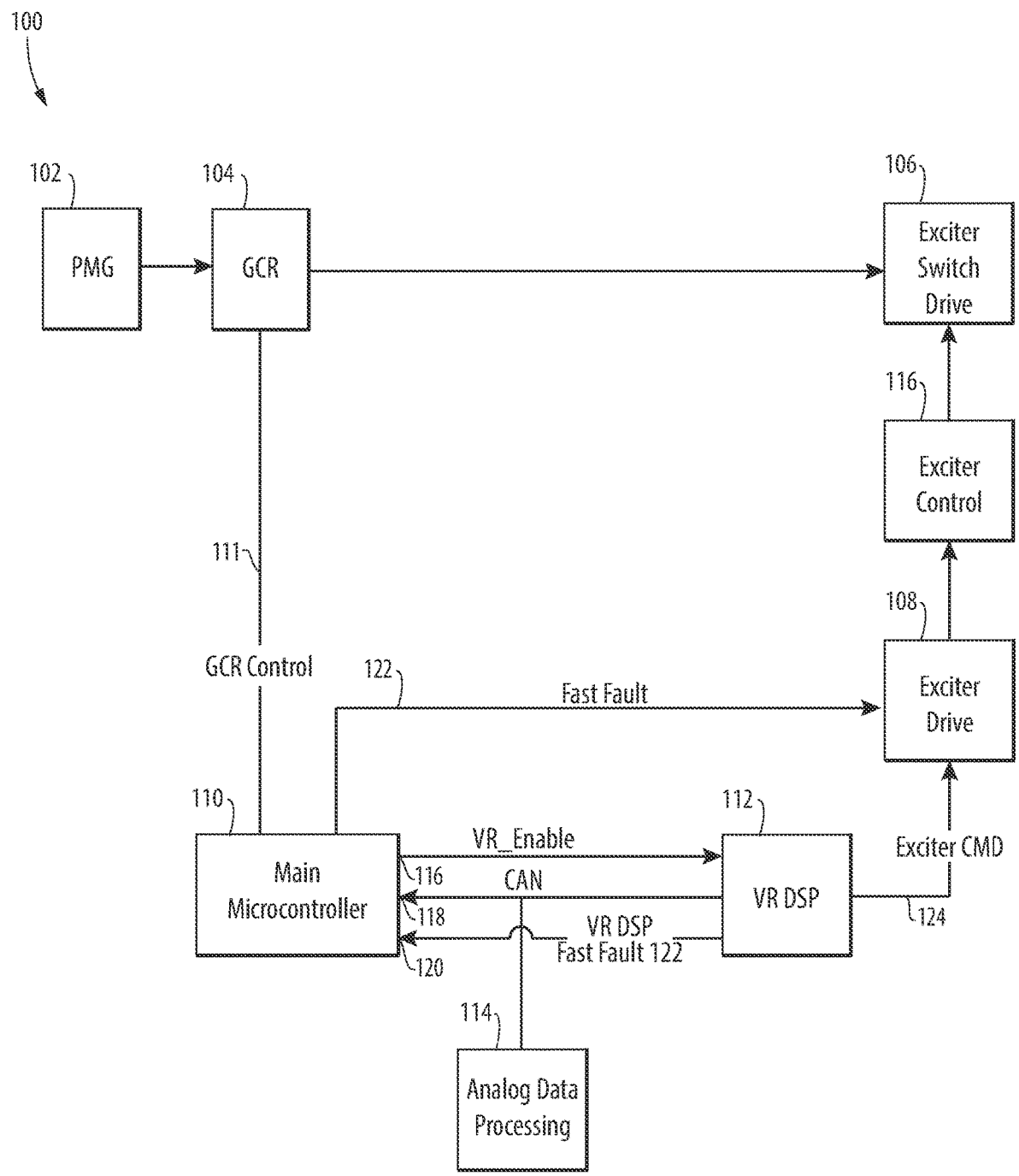

FAST DISCONNECTS FOR GENERATOR SYSTEMS

TECHNICAL FIELD

The present disclosure relates to disconnects, and more particularly to disconnects for generator systems (e.g., between a generator and an exciter drive).

BACKGROUND

Typical generator control units ("GCU") include three processors: one for protection, one for voltage regulation, and one for analog data processing. Both of the protection and analog data processing processors have access to turn off excitation directly by turning off the exciter switches. While the voltage regulator processor commands a zero duty cycle upon detecting a fast fault, such as loss of sense or other built in test related faults, this command still does not turn off the excitation.

Typically, the protection processor message is sent over a Controller Area Network ("CAN") to command the protection processor to perform the protective trip and turn off the exciter switches. However, the time that it takes for the voltage regulator processor to detect the fault, relay the message, and for the protection processor to actually flip the exciter switches could be in the range of 15-20 msec, due to CAN transmission/reception delay for example. Furthermore, during this delay period, a servo and governor control of the generator are still being commanded by the voltage regulation processor until the exciter switches are switched off by the protection processor.

There remains a need in the art, e.g., in the aerospace industry, for faster disconnection between a generator controller and an exciter of the generator during a fault condition. This disclosure provides a solution for this need.

SUMMARY

In accordance with at least one aspect of this disclosure, a system includes a generator control relay configured to electrically connect a generator and an exciter switch drive to drive an exciter switch. A first processor is operatively connected to control a state of the generator control relay to control the electrical connection between a generator and the exciter switch drive. The system includes an exciter drive configured to generate excitation current for field windings of a generator system based on a state of the exciter switch. A second processor is operatively connected to control the exciter drive and to communicate with the first processor during a fault event to place the generator control relay in an open state, disconnecting the generator from the exciter switch drive to prevent generation of excitation current. In certain embodiments, the first processor can include a microcontroller and the second processor can include a voltage regulation processor.

In embodiments, the first processor can include an interrupt input port and the second processor can be operatively connected to the first processor at the interrupt input port for one way communication from the second processor to the first processor. In embodiments, the first processor and the second processor can also be operatively connected for two way communication over a Controlled Area Network (CAN). In embodiments, the second processor can be configured to sense the fault event and communicate a fault event signal to the first processor through the interrupt input port. The first processor can be configured to process the fault event signal through the interrupt input port ahead of any signal communicated from the second processor over the CAN.

In certain embodiments, the first processor can be configured to communicate the fault event signal to the exciter drive to prevent generation of excitation current upstream of the exciter switch drive. In certain such embodiments, the fault event signal communicated from the first processor to the exciter drive can be configured to override a drive command signal communicated from the second processor to the exciter drive.

In embodiments, the first processor can include an interrupt input port and the second processor is operatively connected to the first processor at the interrupt input port for one way communication from the second processor to the first processor. The first processor and the second processor can be operatively connected for two way communication over a Controlled Area Network (CAN) and the fast fault signal received at the interrupt input port of the first processor can be configured to disconnect the generator from the exciter switch drive and to prevent the exciter switch drive from activating faster than if the fast fault signal is received by the first processor over the CAN.

In accordance with at least one aspect of this disclosure, a method includes communicating a fast fault signal from a processor to a microcontroller at an interrupt port of the microcontroller and controlling a generator control relay to disconnect a generator from an exciter switch drive upon receipt of the fast fault signal by the microcontroller. In embodiments, controlling the generator control relay can include opening the generator control relay upon receipt of the fast fault signal by the microcontroller.

The method can further include, communicating the fast fault signal from the microcontroller to an exciter drive and overriding communication between the processor and an exciter drive. In embodiments, the method can further include communicating non-fault event signals between the processor and the microcontroller over a CAN. In embodiments, the method can further include prioritizing the fast fault signal at the interrupt port of the microcontroller over the non-fault event signals communicated to the microcontroller over the CAN.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic diagram in accordance with this disclosure, showing an embodiment of a control scheme for the generator system during a fault event.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100.

In accordance with at least one aspect of this disclosure, a system 100 (e.g. a generator system) can include a generator 102 (e.g., a permanent magnet generator), a generator control relay 104, an exciter switch drive 106 (e.g., for driving an exciter switch, not shown), and an exciter drive 108. The system 100 can also include one or more processors, including a first processor 110 or (e.g., a main microcontroller), a second processor 112 (e.g., a voltage regulation digital signal processor), and a third processor 114 (e.g., an analog data processor). An exciter control module 116 may also be included to control signals between the exciter drive and the exciter switch drive. Any other suitable additional processors may be included for given applications.

The generator control relay 104 can be configured to electrically connect the generator 102 and the exciter switch drive 106 to drive the exciter switch, for example when the relay is in a closed state. The first processor 110 can be operatively connected to control the state of the generator control relay 104 (e.g., over line 111), between the open and closed states, to control the electrical connection between the generator 102 and the exciter switch drive 106. The exciter drive 108 is configured to generate excitation current for field windings of the generator system 100 based on a state of the exciter switch. The second processor 112 is operatively connected to control the exciter drive 108 and to communicate with the first processor 110 during a fault event. If a fault event has occurred, the second processor 112 communicates to the first processor 110 to place the generator control relay 104 in the open state, thereby disconnecting the generator 102 from the exciter switch drive 106 to prevent generation of excitation current.

The first processor 110 can include a number of input/output ports, including an Enable output port 116, a general input/output port 118, and an interrupt input port 120. The Enable port 116 (e.g., VR_enable) can be a port configured to, based on a determination from the first processor 110 that system 100 has no other faults, enable the second processor 112 to start controlling the exciter. As shown, the second processor 112 can be operatively connected to the first processor 110 at any number or all of these ports. More specifically, the second processor 112 can be connected to the first processor 110 at the interrupt input port 120 for one way communication from the second processor 112 to the first processor 110. The first processor 110 and the second processor 112 can also be operatively connected for two way communication over a Controlled Area Network (CAN) at the general input/output port 118.

The second processor 112 can include any suitable circuitry necessary so as to be configured to sense fault events internally, for example faults or shorts occurring between the second processor 112 and the exciter drive 108. This could include a failure in which the exciter drive 108 fails to receive commands from the second processor 112. If such a fault event has occurred and is sensed by the second processor 112, the second processor 112 can then communicate a fault event signal 122 to the first processor 110 through the interrupt input port 120. Upon receipt of the fault event signal 122, the first processor can be configured to process the fault event signal through the interrupt input port 120 ahead of any signal communicated from the second processor 112 over the CAN. For example, signals transmitted between the first and second processors 110, 112 over the CAN will be queued and processed in the order they arrive. However, the interrupt port 120 allows for the first processor 110 to attend to any signal received at the interrupt port 120 ahead of and without regard to those received over the CAN at the input 118. This allows the first processor 110 to take action in disconnecting the generator 102 from the exciter switch drive 106 via the relay 104 faster than if the fault event signal 122 were communicated over the CAN.

Additionally, upon receipt of the fault event signal 122, the first processor 110 can be configured to communicate the fault event signal 122' to the exciter drive 108 to prevent generation of excitation current upstream of the exciter switch drive 106. Here, the fault event signal 122' communicated from the first processor 110 to the exciter drive 108 can override any drive command signal 124 communicated from the second processor 112 to the exciter drive 108. This additional functionality of the first processor 110 can act as a redundant safety measure to ensure that no power is generated during the faulted state, even if the relay 104 fails to open, for example.

Accordingly, because the fast fault signal 122 received is received at the interrupt input port 120 of the first processor 110, the system 100 is able to disconnect the generator 102 from the exciter switch drive 106 and to prevent the exciter drive 108 from activating faster than if the fast fault signal 122 is received by the first processor 110 over the CAN.

In accordance with at least one aspect of this disclosure, a method includes communicating a fast fault signal (e.g., signal 122) from a processor (e.g., second processor 112) to a microcontroller (e.g., first processor 110) at an interrupt port (e.g., port 120) of the microcontroller and controlling a generator control relay (e.g., relay 104) to disconnect a generator (e.g., generator 102) from an exciter switch drive (e.g., drive 106) upon receipt of the fast fault signal by the microcontroller. Controlling the generator control relay can include opening the generator control relay upon receipt of the fast fault signal by the microcontroller.

The method can further include, communicating the fast fault signal from the microcontroller to an exciter drive (e.g., drive 108) and overriding communication between the processor and an exciter drive. In embodiments, the method can further include communicating non-fault event signals between the processor and the microcontroller over a CAN, for example in normal operation and even when the fault signal is communicated from the processor and the microcontroller. Because the signals can be transmitted simultaneously, the method can further include prioritizing the fast fault signal at the interrupt port of the microcontroller over the non-fault event signals communicated to the microcontroller over the CAN.

In embodiments, a health status of the second processor (e.g., the voltage regulation processor 112), including whether any fault has occurred within the second processor, is communicated over the interrupt port of the microcontroller to bypass the CAN and allow for immediate disconnection from the generator with the generator control relay and a shutdown of the system without processor delay. This prevents the need for the microcontroller to: wait until the fault signal reaches the front of the signal queue, open the signal packet, communicate the signal packet contents to the relay control portion of the microcontroller, and then command the relay to open. During this time, for example in typical systems which communicate the fault signal over CAN, high voltage will be building up at the high side switch while because the permanent magnet generator is still providing voltage to the switch while the signals are processing. Embodiments thus not only save a considerable amount of time between sensing the fault and actually shutting down the system, but because of this, embodiments can prevent the additional voltage build up from occurring, improving the overall safety of the system.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," "processor," or "system." A "circuit," "module," "processor," or "system" can include one or more portions of one or more separate physical hardware and/or software components that can together perform the disclosed function of the "circuit," "module," "processor," or "system", or a "circuit," "module," "processor," or "system" can be a single self-contained unit (e.g., of hardware and/or software). Furthermore, aspects of this disclosure may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system comprising:
   a generator control relay configured to electrically connect a generator and an exciter switch drive to drive an exciter switch;

a first processor operatively connected to control a state of the generator control relay to control the electrical connection between a generator and the exciter switch drive;

an exciter drive configured to generate excitation current for field windings of a generator system based on a state of the exciter switch; and a second processor operatively connected to control the exciter drive and to communicate with the first processor during a fault event to place the generator control relay in an open state, disconnecting the generator from the exciter switch drive to prevent generation of excitation current, wherein the first processor includes an interrupt input port and wherein the second processor is operatively connected to the first processor at the interrupt input port for one way communication from the second processor to the first processor, wherein the first processor and the second processor are operatively connected for two way communication over a Controlled Area Network (CAN), wherein the second processor is configured to sense the fault event and communicate a fault event signal to the first processor through the interrupt input port.

2. The system of claim 1, wherein the first processor is configured to process the fault event signal through the interrupt input port ahead of any signal communicated from the second processor over the CAN.

3. The system of claim 2, wherein the first processor is configured to communicate the fault event signal to the exciter drive to prevent generation of excitation current upstream of the exciter switch drive.

4. The system of claim 3, wherein the fault event signal communicated from the first processor to the exciter drive is configured to override a drive command signal communicated from the second processor to the exciter drive.

5. The system of claim 1, wherein the fast fault signal received at the interrupt input port of the first processor is configured to disconnect the generator from the exciter switch drive and to prevent the exciter switch drive from activating faster than if the fast fault signal is received by the first processor over the CAN.

6. The system of claim 1, wherein the first processor includes a microcontroller.

7. The system of claim 1, wherein the second processor includes a voltage regulation processor.

8. A method of controlling the system of claim 1,
communicating a fast fault signal indicative of the fault event from the second processor to the input interrupt port of the first processor; and
controlling the generator control relay to disconnect the generator from the exciter switch drive upon receipt of the fast fault signal by the first processor from the second processor.

9. The method of claim 8, wherein controlling the generator control relay includes opening the generator control relay upon receipt of the fast fault signal by the microcontroller.

10. The method of claim 8, further comprising:
communicating the fast fault signal from the microcontroller to the exciter drive; and
overriding communication between the processor and the exciter drive.

11. The method of claim 8, further comprising:
communicating non-fault event signals between the processor and the microcontroller over the CAN.

12. The method of claim 11, further comprising:
prioritizing the fast fault signal at the interrupt port of the microcontroller over the non-fault event signals communicated to the microcontroller over the CAN.

* * * * *